United States Patent
Ravishankar et al.

(10) Patent No.: US 10,786,809 B2
(45) Date of Patent: *Sep. 29, 2020

(54) ADDITIVE AND A CATALYST COMPOSITION COMPRISING THE ADDITIVE FOR FCC PROCESS

(71) Applicant: Hindustan Petroleum Corporation Limited, Mumbai (IN)

(72) Inventors: Raman Ravishankar, Bengaluru (IN); Peddy Venkata Chalapathi Rao, Bengaluru (IN); Nettem Venkateswarlu Choudary, Bengaluru (IN)

(73) Assignee: HINDUSTAN PETROLEUM CORPORATION LIMITED, Mumbai (IN)

( * ) Notice: Subject to any disclaimer, the term of this patent is extended or adjusted under 35 U.S.C. 154(b) by 181 days.

This patent is subject to a terminal disclaimer.

(21) Appl. No.: 15/762,004

(22) PCT Filed: Jun. 1, 2016

(86) PCT No.: PCT/IB2016/053222
§ 371 (c)(1),
(2) Date: Mar. 21, 2018

(87) PCT Pub. No.: WO2017/051261
PCT Pub. Date: Mar. 30, 2017

(65) Prior Publication Data
US 2018/0272324 A1   Sep. 27, 2018

(30) Foreign Application Priority Data

Sep. 22, 2015 (IN) .......................... 3601/MUM/2015

(51) Int. Cl.
| | | |
|---|---|---|
| *B01J 29/06* | (2006.01) | |
| *B01J 29/80* | (2006.01) | |
| *B01J 29/40* | (2006.01) | |
| *B01J 29/85* | (2006.01) | |
| *C10G 11/05* | (2006.01) | |
| *B01J 37/02* | (2006.01) | |
| *B01J 37/00* | (2006.01) | |
| *B01J 29/48* | (2006.01) | |
| *B01J 35/10* | (2006.01) | |
| *B01J 29/70* | (2006.01) | |
| *B01J 29/78* | (2006.01) | |
| *B01J 37/28* | (2006.01) | |
| *C10G 11/18* | (2006.01) | |
| *B01J 27/16* | (2006.01) | |

(Continued)

(52) U.S. Cl.
CPC ............ *B01J 29/80* (2013.01); *B01J 29/061* (2013.01); *B01J 29/405* (2013.01); *B01J 29/48* (2013.01); *B01J 29/708* (2013.01); *B01J 29/7084* (2013.01); *B01J 29/7815* (2013.01); *B01J 29/7853* (2013.01); *B01J 29/7861* (2013.01); *B01J 29/7869* (2013.01); *B01J 29/85* (2013.01); *B01J 35/1014* (2013.01); *B01J 35/1019* (2013.01); *B01J 35/1038* (2013.01); *B01J 37/0045* (2013.01); *B01J 37/0201* (2013.01); *B01J 37/28* (2013.01); *C10G 11/05* (2013.01); *C10G 11/18* (2013.01); *B01J 23/06* (2013.01); *B01J 23/08* (2013.01); *B01J 27/16* (2013.01); *B01J 37/30* (2013.01); *B01J 2029/062* (2013.01); *B01J 2229/18* (2013.01); *B01J 2229/186* (2013.01); *B01J 2229/42* (2013.01); *B01J 2523/27* (2013.01); *B01J 2523/32* (2013.01); *B01J 2523/51* (2013.01)

(58) Field of Classification Search
CPC . B01J 29/80; B01J 29/85; B01J 29/061; B01J 2029/062; B01J 29/405; B01J 29/48; B01J 29/7057; B01J 29/708; B01J 29/7084; B01J 29/7815; B01J 29/7853; B01J 29/7861; B01J 29/7869; B01J 29/7876; B01J 2229/42; B01J 2229/20; B01J 2229/18; B01J 2229/186; B01J 37/28; B01J 37/30; B01J 37/0009; B01J 37/0201; B01J 37/0045; B01J 2523/51; B01J 2523/27; B01J 2523/32
USPC ........ 502/60, 61, 63, 64, 67, 71, 73, 77, 214
See application file for complete search history.

(56) References Cited

U.S. PATENT DOCUMENTS

| | | | | |
|---|---|---|---|---|
| 6,203,694 | B1 * | 3/2001 | Love ...................... | C10G 35/06 208/120.01 |
| 2004/0092386 | A1 * | 5/2004 | Brady .................... | B01J 29/405 502/64 |

(Continued)

FOREIGN PATENT DOCUMENTS

WO      2015/001004      1/2015

*Primary Examiner* — Elizabeth D Wood
(74) *Attorney, Agent, or Firm* — Sand, Sebolt & Wernow Co., LPA

(57) ABSTRACT

The present disclosure relates to an additive and a catalyst composition for a catalytic cracking process of vacuum gas oil for preparing cracked run naphtha having reduced liquid olefin content, and increased propylene and butylene yields in the LPG fraction. The process makes use of a catalyst composition which is a mixture of an FCC equilibrated catalyst and an additive comprising a zeolite, phosphorus and a combination of metal promoters. The process is successful in achieving high propylene and butylene yields in the LPG fraction along with a lower liquid olefin content and increased aromatic content with increase in RON unit in the resultant cracked run naphtha, as compared to that achieved using an FCC equilibrated catalyst alone.

5 Claims, No Drawings

(51) Int. Cl.
  *B01J 23/06* (2006.01)
  *B01J 23/08* (2006.01)
  *B01J 37/30* (2006.01)

(56) References Cited

U.S. PATENT DOCUMENTS

| | | | |
|---|---|---|---|
| 2004/0266608 A1* | 12/2004 | Long | B01J 29/061 |
| | | | 502/68 |
| 2007/0060780 A1* | 3/2007 | Stamires | B01J 29/40 |
| | | | 585/653 |
| 2010/0230324 A1* | 9/2010 | Al-Alloush | B01J 29/80 |
| | | | 208/82 |
| 2011/0120912 A1 | 5/2011 | Bourane | |
| 2015/0165427 A1* | 6/2015 | Awayssa | B01J 29/80 |
| | | | 585/651 |
| 2016/0136625 A1* | 5/2016 | Haw | B01J 35/1061 |
| | | | 585/653 |

* cited by examiner

ADDITIVE AND A CATALYST COMPOSITION COMPRISING THE ADDITIVE FOR FCC PROCESS

FIELD

The present disclosure relates to an additive for a catalyst composition for a fluid catalytic cracking process.

DEFINITION

As used in the present disclosure, the following word/phrase is generally intended to have the meaning as set forth below, except to the extent that the context in which it is used indicates otherwise.

FCC EQUILIBRATED CATALYST (ECAT): ECAT is a "used/spent" catalyst, containing at least some of the catalyst charged originally. ECAT is used in the petroleum refining industry to convert crude oil fractions into smaller molecular weight hydrocarbon compounds.

BACKGROUND

Vacuum distillation of crude oil results in a variety of petroleum products with a wide range of molecular weights. The heavier hydrocarbon fractions, usually, the left-overs from the vacuum distillation process are converted and refined into more valuable lower molecular weight hydrocarbons with the help of a fluid catalytic cracking (FCC) unit. The ever-increasing demand for gasoline has seen a surge in such refining units.

Vacuum Gas Oil (VGO), a component of the heavier hydrocarbons, is subjected to cracking in an FCC unit, resulting in cracked run naphtha (CRN), fuel oil and offgas as the end-products. The cracked run naphtha (CRN) produced by the cracking of VGO, typically, contains around 45% to 55% liquid olefins. When these liquid olefins come in contact with dissolved oxygen, they form hydro peroxides as immediate products, which undergo further reactions to form insoluble oxidized species. These oxidized species that include peroxides, aldehydes, acids, ketones as well as components with molecular weights 200 to 600 g/mol are commonly referred to as gum. This insoluble gum formation in the interior of the process units results in fouling. Although, rigorous exclusion of oxygen or the addition of anti-oxidants are enough to eliminate fouling, in some industrial situations oxygen ingress cannot be easily prevented. If the liquid olefin content in the CRN is brought down, the gum formation and hence, fouling can be controlled.

Also, the demand for propylene is more as compared to the other cracked products. Various attempts have been made to increase the yield of propylene during cracking. Attempts have been made in the past to improve both the FCC process and the catalyst used in the FCC process. Though, an increase in the propylene yield was observed, the amount of propylene obtained was still low (typically less than 6%).

Thus, there is a felt need to increase the propylene yield and reduce the liquid olefin content simultaneously in a fluid catalytic cracking process.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an additive for a catalyst composition for a fluid catalytic cracking process.

Another object of the present disclosure is to provide a catalyst composition for a fluid catalytic cracking process.

Still another object of the present disclosure is to provide a fluid catalytic cracking process.

Yet another object of the present disclosure is to provide a fluid catalytic cracking process to obtain a product having an increased propylene yield, an increased butylene yield, reduced liquid olefin content and reduced coke content.

Other objects and advantages of the present disclosure will be more apparent from the following description, which is not intended to limit the scope of the present disclosure.

SUMMARY

In accordance with an aspect of the present disclosure there is provided an additive for a catalyst composition for a fluid catalytic cracking process. The additive comprises a zeolite impregnated with phosphorus in the range of 10 wt % to 15 wt % with respect to the weight of the zeolite and a combination of metal promoters comprising zinc and gallium, independently in the range of 1.0 wt % to 4.0 wt % with respect to the weight of the zeolites. The "Phosphorus" promoted zeolite is spray-dried and the formulation is loaded with the metal promoters.

A catalyst composition comprising an FCC equilibrated catalyst (ECAT) in the range of 80 wt % to 99 wt % and an additive in the range of 1 wt % to 20 wt %, for a fluid catalytic cracking process is also provided in the present disclosure.

The present disclosure further provides a fluid catalytic cracking process for obtaining a product having increased propylene yield, increased butylene yield, decreased liquid olefin content and reduced coke content, using a catalyst composition. The catalyst composition comprises an FCC equilibrated catalyst (ECAT) and an additive.

DETAILED DESCRIPTION

The present disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure in an aspect relates to an additive for a catalyst composition for a fluid catalytic cracking process. The additive comprises a zeolite impregnated with phosphorus in the range of 10 wt % to 15 wt % with respect to the weight of the zeolite and a combination of metal promoters comprising zinc and gallium, independently in the range of 1.0 wt % to 4.0 wt % with respect to the weight of the zeolite.

In an exemplary embodiment of the present disclosure, the amount of the phosphorous in the zeolite is 12 wt %, with respect to the weight of the zeolite.

The precursor of phosphorus is at least one selected from the group consisting of phosphoric acid, phosphates, phosphorous acid, phosphites, pyrophosphoric acid, pyrophosphates, polymeric phosphoric acid, polyphosphates, metaphosphoric acid and metaphosphates.

In an exemplary embodiment of the present disclosure, the amount of the metal promoters with respect to the weight of the zeolite is: 1 wt % zinc and 2 wt % gallium.

In accordance with the embodiments of the present disclosure, the precursor for each of the metal promoters is a salt of the metal. In an exemplary embodiment of the present disclosure, the precursor of the metal promoter is a nitrate salt of the metal.

The zeolite is at least one selected from the group consisting of ZSM-5, ZSM-11, ZSM-12, ZSM-48, ZSM-57, SAPO-5, SAPO-11, SAPO-17, SAPO-18, SAPQ-34, SAPO-44, MCM-22, ZSM-Y and zeolite-beta.

The present disclosure, in an embodiment provides a catalyst composition for a fluid catalytic cracking process. The catalyst composition comprises an FCC equilibrated catalyst (ECAT) and an additive as described hereinabove.

In accordance with the embodiments of the present disclosure, the FCC equilibrated catalyst (ECAT) is present in the range of 80 wt % to 99 wt % of the catalyst and the additive is present in the range of 1 wt % to 20 wt % of the catalyst composition.

In an exemplary embodiment, the FCC equilibrated catalyst (ECAT) and the additive are present in the ratio of 93:7 wt %. In another exemplary embodiment, the FCC equilibrated catalyst (ECAT) and the additive are present in the ratio of 85:15 wt %.

The catalyst composition is used for a fluid catalytic cracking (FCC) process for obtaining a product having an increased propylene yield, increased butylene yield, reduced liquid olefin content and reduced coke content. In the conventional catalytic cracking process, while processing a vacuum gas oil feedstock an FCC equilibrated catalyst (ECAT) is used which yields propylene, typically, less than 6% and the resultant cracked run naphtha has significant liquid olefin content. In particular, the present disclosure relates to a process that makes use of an additive in combination with an FCC equilibrated catalyst (ECAT), the mixture thereof increases the propylene yield above 7%, increases the butylene yield and reduces the liquid olefin content.

In an embodiment of the present disclosure, an FCC process for obtaining a resultant product having a propylene yield in the range of 7% to 16%, butylene yield in the range of 8% to 10%, liquid olefinic content in the range of 10% to 45% and coke content in the range of 2% to 7%, from vacuum gas oil, is disclosed. The catalytic reactor, i.e., a fixed fluid bed micro reactor unit (ACE unit) is supplied by M/s Kayser Technologies, Inc, Houston, USA.

The cracking reactions are carried in the temperature range of 400° C. to 700° C. and at a pressure ranging from 1 atm to 2 atm. In an exemplary embodiment, the reactor is maintained at 530° C. and 1 atm pressure.

The feedstock is vacuum gas oil (VGO) obtained as a left-over from the vacuum distillation of crude oil. An inert gas, a non-limiting example of which is nitrogen, is selected as a carrier gas. The VGO is contacted with a catalyst composition comprising an FCC equilibrated catalyst (ECAT) and an additive comprising a zeolite impregnated with phosphorus and metal promoters comprising a combination of zinc and gallium independently in the range of 1.0 wt % to 4.0 wt % with respect to the weight of the zeolite.

The resultant product obtained has a propylene yield in the range of 7% to 16%, butylene in the range of 8% to 10%, liquid olefin content in the range of 10% to 45% and coke content in the range of 2 to 7%.

The present disclosure is further described in light of the following experiments which are set forth for illustration purpose only and not to be construed for limiting the scope of the disclosure. The following laboratory scale examples performed in the ACE-MAT testing unit can be scaled up to industrial/commercial scale.

EXAMPLES

Catalytic cracking experiments were carried out in a fixed fluid bed micro reactor unit (ACE unit) supplied by M/s Kayser Technologies, Inc, Houston, USA. The cracking reactions were performed at a temperature of 530° C. and at a pressure of 1 atm and a constant injection time of 30 seconds. The catalyst/vacuum-gas-oil ratio was varied from 3 to 6 wt/wt.

The gaseous products were analyzed using Inficon 3000 micro-GC & Liquid products were analyzed by ASTM 2887 in LT SIMDIS supplied by AC Analytical Controls. The liquid products considered were Gasoline (C5 at 221° C.), LCO (from 221-370° C.) & Bottoms (above 370° C.). Prefrac-PIONA analysis of the liquid samples was carried out using PIONA analyzer and PAC instruments. The conversion was calculated as the sum of the yields of dry gas, LPG, Gasoline and coke.

Catalyst:

The base catalyst used in the cracking reactions was commercial FCC equilibrated catalyst (ECAT). Additives of the present disclosure were studied at 7 wt % and 15 wt % with the base ECAT. The typical equilibrated catalyst ECAT properties are listed in Table-1.

TABLE 1

| Properties of commercial equilibrated catalyst (ECAT) | |
|---|---|
| Attribute | FCC ECAT |
| Physical Analysis | |
| Surface area, m$^2$/g | 135 |
| Pore volume (PV), cc/g | 0.31 |
| Zeolite surface area (ZSA), m$^2$/g | 74 |
| Matrix surface area (MSA), m$^2$/g | 61 |
| % Crystallinity | 11.4 |
| Metals, ppm | |
| Ni | 2000 |
| V | 1350 |
| Na | 0.29 |
| Fe | 0.28 |
| Sb | 180 |
| Chemical Analysis, wt % | |
| Rare earth, wt % | 1.75 |
| Al$_2$O$_3$, wt % | 52.1 |
| P$_2$O$_5$, wt % | 0.43 |

Feedstock:

The feed used in the present disclosure was vacuum gas oil (VGO). The detail properties of the feed are listed in Table-2.

TABLE 2

Properties of the feedstock

| Properties | VGO |
|---|---|
| Density at 15° C., g/cc | 0.915 |
| Sulphur, wt % | 2.0 |
| CCR, wt % | 0.60 |
| Pour point, ° C. | 45 |
| Kinematic viscosity @100° C., cSt | 7.742 |
| ASTM-7169 Distillation, wt % | |
| Initial Boiling Point (IBP) | 283 |
| 5 | 345 |
| 10 | 365 |
| 30 | 404 |
| 50 | 429 |
| 70 | 457 |
| 90 | 506 |
| 95 | 529 |
| Metals, ppm | |
| Ni | 1.0 |
| V | 0.9 |
| Na | 1.05 |
| Fe | 1.35 |
| SARA, wt % | |
| Saturates | 57.1 |
| Aromatics | 33.3 |
| Resins | 9.4 |
| Asphaltenes | 0.2 |

Preparation of the Additive and the Catalyst of the Present Disclosure:

ZSM-5 with a $SiO_2/Al_2O_3$ mole ratio of 23 was used as the zeolite for the additive.

10 g of ZSM-5 sample was mixed with varying quantities of ortho phosphoric acid solution and a metal salt solution, especially, a metal nitrate solution to form slurry. The resultant slurry was agitated thoroughly at 25° C. for 3 hours for allowing phosphorus and the metals to impregnate the zeolite followed by heating in a rotary evaporator maintained at 75° C. under vacuum to obtain a dried mass. The dried mass was calcined at 550° C. for 5 hours and finally ground to obtain an additive powder.

The additive powder was mixed with binder/matrix such as alumina (such as hydrated alumina, gamma alumina, alpha alumina, and psuedoboehmite), fillers such as clay (bentonite, saponite, montmorillonite, kaolin, smectite, etc.). The ratio of active zeolite component:Binder/matrix:filler is: 40:50:10 (wt %). The additive powder, binder/matrix and filler were mixed in water to obtain a slurry. The slurry was spray dried to obtain particles having a size of 100 micrometers. The spray dried particles were then calcined at 600° C. for 5 hours to obtain the additive of the present disclosure which is used in the FCC process.

The final catalyst additive formulation contained the metal promoters in both zeolite and binder/matrix. Thus, the whole formulation was active in the FCC cracking process producing higher propylene content and lower olefins content in the resultant product.

FCC ECAT was mixed with this additive powder in ratios ranging from 80:20 to 99:1 wt % and was used as catalyst.

In case of a mixture of metals, all the metal salts were weighed accordingly and dissolved in a required amount of water.

The additives were loaded with phosphorus and metal promoters, according to the following Table-3

TABLE 3

Metal loading on ZSM-5

| Promoter name | "P" Loading with respect to total zeolite content | Metal Promoter Loading on zeolite |
|---|---|---|
| MM2 | 12% | 1% Zn and 2% Ga |

Example 1: Catalytic Cracking with FCC ECAT (Comparative Example)

Catalytic cracking of VGO was carried out with 100% FCC ECAT at a reactor temperature of 530° C., constant injection time of 30 seconds and catalyst/vacuum-gas-oil ratios of 3.0, 3.9, 4.8 and 6 wt/wt. Propylene yield obtained using ECAT is in the range of 6 to 7 wt % for a varying catalyst/vacuum-gas-oil ratio. Table 4 gives the composition of the resultant cracked run naphtha obtained.

TABLE 4

Product composition from Example 1

| Catalyst | ECAT | | | |
|---|---|---|---|---|
| Feed | VGO | | | |
| Cracking Temperature, ° C. | 530.0 | 530.0 | 530.0 | 530.0 |
| Catalyst to vacuum-gas-oil ratio, wt/wt | 3.00 | 3.90 | 4.80 | 6.00 |
| Conversion, wt % | 69.73 | 73.18 | 75.56 | 77.93 |
| YIELDS, wt %: | | | | |
| Coke | 3.39 | 4.40 | 5.05 | 6.48 |
| Dry Gas ($H_2$, $C_1$—$C_2$) | 2.60 | 2.90 | 3.16 | 3.50 |
| LPG | 19.29 | 21.19 | 21.96 | 23.33 |
| Propylene | 6.13 | 6.55 | 6.66 | 6.87 |
| Butylenes | 7.28 | 7.42 | 7.30 | 6.98 |
| Gasoline ($C_5$-216° C.) | 44.45 | 44.68 | 45.39 | 44.62 |
| LCO (216-370° C.) | 19.23 | 18.32 | 16.83 | 15.52 |
| Unconverted (above 370° C.) | 10.80 | 8.73 | 7.61 | 6.55 |
| % Liq. Olefins | 32.00 | 27.00 | 25.00 | 20.02 |
| % Reduction of liq. Olefins | 0 | 0 | 0 | 0 |
| % Aromatics | 32.89 | 37.49 | 39.65 | 45.79 |
| % Increase in Aromatics | 0 | 0 | 0 | 0 |
| RON | 94.9 | 96.1 | 97.2 | 98.4 |
| Increase in RON Units | 0 | 0 | 0 | 0 |

Example 2: Catalytic Cracking with 93 wt % FCC ECAT+7 wt % MM2 Additive

The catalyst of Example 2 comprised 7 wt % MM2 additive with 93 wt % FCC ECAT. Catalytic cracking reactions of VGO at reactor temperature of 530° C., constant injection time of 30 seconds and cat/vacuum-gas-oil ratios of 3.0, 3.9, 4.8 and 6 wt/wt are studied to see the effect.

Propylene and liquid olefin content are shown in Table 5.

TABLE 5

Product composition from Example 2

| Catalyst | ECAT + MM2 additive (93 wt % + 7 wt %) | | | |
|---|---|---|---|---|
| Feed | VGO | | | |
| Cracking Temperature, ° C. | 530.0 | 530.0 | 530.0 | 530.0 |

TABLE 5-continued

Product composition from Example 2

| Catalyst | ECAT + MM2 additive (93 wt % + 7 wt %) | | | |
|---|---|---|---|---|
| Feed | VGO | | | |
| Catalyst-to vacuum-gas-oil, wt/wt | 3.00 | 3.90 | 4.80 | 6.00 |
| Conv., wt % | 68.69 | 71.83 | 74.07 | 76.36 |
| YIELDS, wt %: | | | | |
| Coke | 2.93 | 3.29 | 3.98 | 5.09 |
| Dry Gas ($H_2$, $C_1$—$C_2$) | 3.49 | 3.68 | 4.20 | 4.74 |
| LPG | 26.20 | 27.80 | 29.25 | 30.42 |
| Propylene | 9.77 | 9.99 | 9.93 | 9.64 |
| Butylenes | 9.27 | 9.16 | 8.80 | 8.29 |
| Gasoline (C5-216° C.) | 35.42 | 36.53 | 35.91 | 35.58 |
| LCO (216-370° C.) | 19.96 | 19.43 | 17.46 | 16.48 |
| Unconverted (370° C.+) | 12.00 | 10.27 | 9.19 | 7.69 |
| % Liq. Olefins | 35.30 | 28.16 | 22.61 | 18.93 |
| % Reduction of liq. Olefins | −10.31 | −4.30 | 9.56 | 5.45 |
| % Aromatics | 37.13 | 25.87 | 50.05 | 55.69 |
| % Increase in Aromatics | 12.891 | −30.995 | 26.230 | 21.620 |
| RON | 96.9 | 97.5 | 98.5 | 102.8 |
| Increase in RON Units | 2.000 | 1.400 | 1.300 | 4.400 |

Propylene yields obtained with 7 wt % MM2 additive in ECAT is in the range of 9.6 wt % to 10.0 wt %, which gives an increase by 3.1 wt % to 3.5 wt % as compared to the propylene content in Example 1. ΔLPG obtained as compared to Example-1 is from 6.9 wt % to 7.1 wt %. However, this additive is coke selective as compared to Example-1 and Δcoke reduction is by 0.45 wt % to 1.4 wt %. The butylene yield was also higher as compared to example 1. An increase in aromatics yield in the range of 12.89% to 26.23% was observed. An increase in the RON units in the range of 1.3 units to 4.4 units is also observed.

Example 3: Catalytic Cracking with 85 wt % FCC ECAT+15 wt % MM2 Additive

The catalyst of Example 3 comprised 15 wt % MM2 additive with 85 wt % FCC ECAT. Catalytic cracking reactions of VGO at reactor temperature of 530° C., constant injection time of 30 seconds and cat/vacuum-gas-oil ratios of 3.0, 3.9, 4.8 and 6 wt/wt are studied to see the effect. Propylene and liquid olefin content are shown in Table 6.

TABLE 6

Product composition from Example 3

| Catalyst | ECAT + MM2 additive (85 wt % + 15 wt %) | | | |
|---|---|---|---|---|
| Feed | VGO | | | |
| Cracking Temperature, ° C. | 530.0 | 530.0 | 530.0 | 530.0 |
| Catalyst-to vacuum-gas-oil, wt/wt | 3.00 | 3.90 | 4.80 | 6.00 |
| Conv., wt % | 67.07 | 70.04 | 73.40 | 75.83 |
| YIELDS, wt %: | | | | |
| Coke | 2.89 | 2.92 | 3.94 | 5.10 |
| Dry Gas ($H_2$, $C_1$—$C_2$) | 3.71 | 4.29 | 5.02 | 5.41 |
| LPG | 26.73 | 28.33 | 30.68 | 31.14 |
| Propylene | 10.06 | 10.36 | 10.28 | 9.70 |
| Butylenes | 9.53 | 9.38 | 9.10 | 8.36 |
| Gasoline ($C_5$-216° C.) | 33.08 | 33.85 | 33.21 | 33.51 |
| LCO (216-370° C.) | 20.19 | 19.25 | 17.75 | 16.77 |
| Unconverted (above 370° C.) | 13.40 | 11.36 | 9.41 | 8.08 |

TABLE 6-continued

Product composition from Example 3

| Catalyst | ECAT + MM2 additive (85 wt % + 15 wt %) | | | |
|---|---|---|---|---|
| Feed | VGO | | | |
| % Liq. Olefins | 30.66 | — | 20.09 | 16.63 |
| % Reduction of liq. Olefins | 4.19 | 100.00 | 19.64 | 16.93 |
| % Aromatics | 25.52 | 44.54 | 55.04 | 61.65 |
| % Increase in Aromatics | −22.408 | 18.805 | 38.815 | 34.636 |
| RON | 89.5 | 100.6 | 104.3 | 104.7 |
| Increase in RON Units | −5.400 | 4.500 | 7.100 | 6.300 |

Propylene yield obtained with 15 wt % additive in ECAT is in the range of 9.7 wt % to 10.36 wt %, which is an increase by 2.8% to 4.0%. The butylene yield was found to be in the range of 8.36% to 9.54%, an increase of 1.38% to 2.25% as compared to Example-1. ΔLPG yield obtained compared to Example-1 is 7.4 wt % to 7.85 wt %. Also, liquid olefin content has decreased (reduction by 4.188% to 16.933%). However, this additive is coke selective compared to Example-1 and delta coke reduction is found to be in the range of 0.5 wt % to 1.4 wt %. Upon increasing the cat/oil ratio, increase in the aromatic yields in the range of 18.81% to 38.82% was observed. Also, an increase in RON units in the range of 4.5 units to 7.1 units was observed.

It is found that, using the catalyst composition of the present disclosure, an increase in the propylene yield and in the butylene yield, is obtained in the resultant product, as compared to those of the base catalyst FCC ECAT. This was also accompanied by a reduction in liquid olefin content and the coke yield, especially at higher catalyst to vacuum-gas-oil ratios.

Technical Advances and Economical Significance

The present disclosure described herein above has several technical advantages including, but not limited to, the realization of:
A catalyst composition comprising an additive for an FCC process that provides a product having increased propylene and butylene yields and reduced liquid olefin content; reduced coke yields; with an increase in aromatic yields and the increase in RON units;
an FCC process that is more profitable; and
an FCC process that causes reduced fouling of the reactors.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values ten percent higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An additive for a catalyst composition for a fluid catalytic cracking process comprising a zeolite impregnated with phosphorus in an amount of 12 wt % with respect to the weight of said zeolite and a combination of metal promoters comprising zinc and gallium, independently in the range of 1.0 wt % to 4.0 wt % with respect to the weight of said zeolite.

2. The additive as claimed in claim 1, wherein a precursor of phosphorus is at least one phosphorus compound selected from the group consisting of phosphoric acid, phosphates, phosphorous acid, phosphites, pyrophosphoric acid, pyrophosphates, polymeric phosphoric acid, polyphosphates, metaphosphoric acid and metaphosphates.

3. The additive as claimed in claim 1, wherein an amount of said metal promoters with respect to the weight of said zeolite are:
    a. 1 wt % zinc; and
    b. 2 wt % gallium.

4. The additive as claimed in claim 1, wherein a precursor for each of said metal promoter is a nitrate salt of said respective metal.

5. The additive as claimed in claim 1, wherein said zeolite is at least one selected from the group consisting of ZSM-5, ZSM-11, ZSM-12, ZSM-48, ZSM-57, SAPO-5, SAPO-11, SAPO-17, SAPO-18, SAPO-34, SAPO-44, MCM-22, zeolite-Y and zeolite-Beta.

* * * * *